S. A. PASCALES.
LIFE SAVING DEVICE.
APPLICATION FILED MAY 28, 1920.

1,363,166. Patented Dec. 21, 1920.
6 SHEETS—SHEET 1.

INVENTOR
Stelfanos A. Pascales
BY
ATTORNEYS

S. A. PASCALES.
LIFE SAVING DEVICE.
APPLICATION FILED MAY 28, 1920.
1,363,166.
Patented Dec. 21, 1920.
6 SHEETS—SHEET 4.
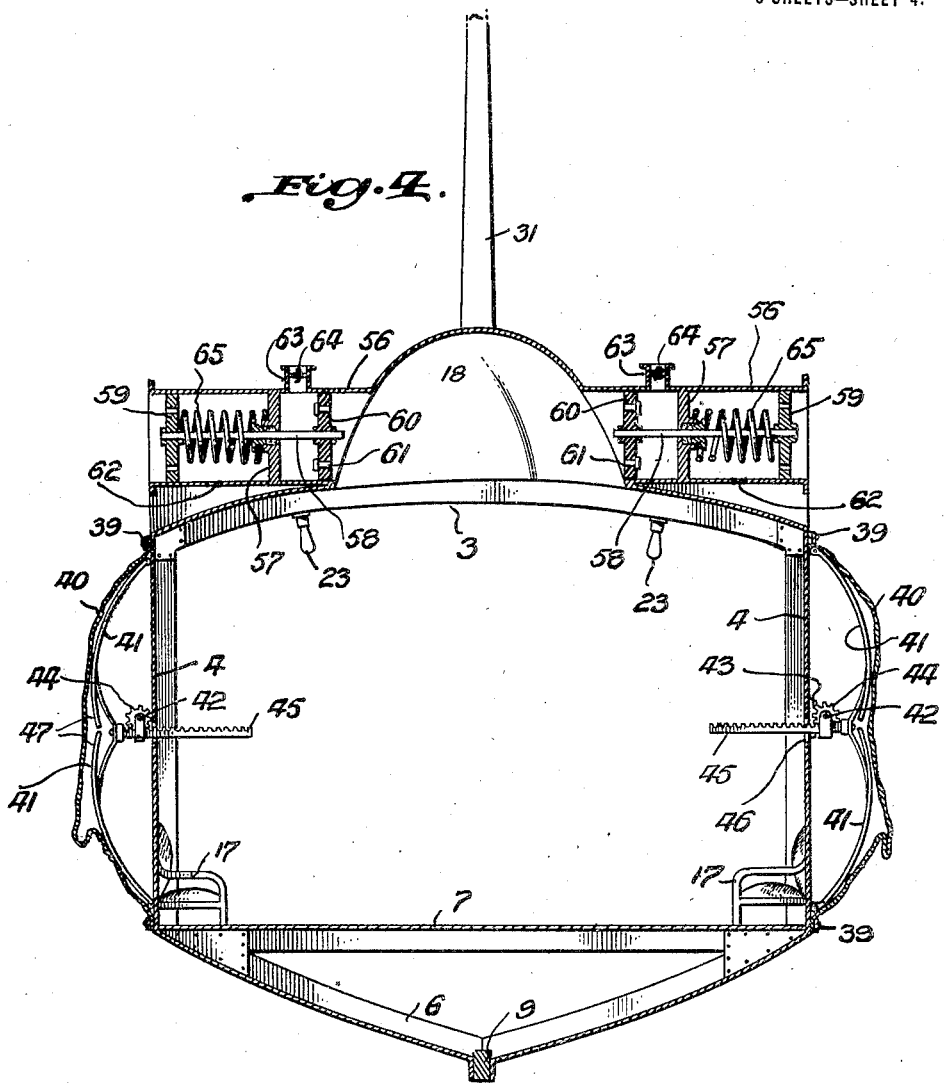
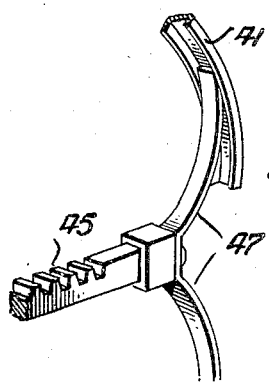
INVENTOR
STELEANOS A. PASCALES
BY
ATTORNEYS.

S. A. PASCALES.
LIFE SAVING DEVICE.
APPLICATION FILED MAY 28, 1920.
1,363,166.
Patented Dec. 21, 1920.
6 SHEETS—SHEET 5.
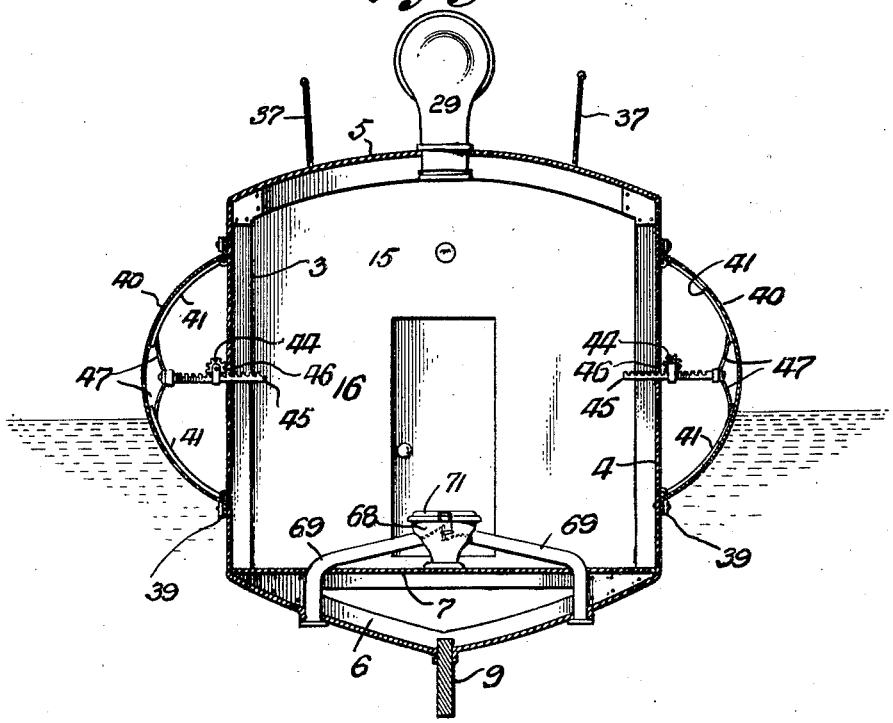
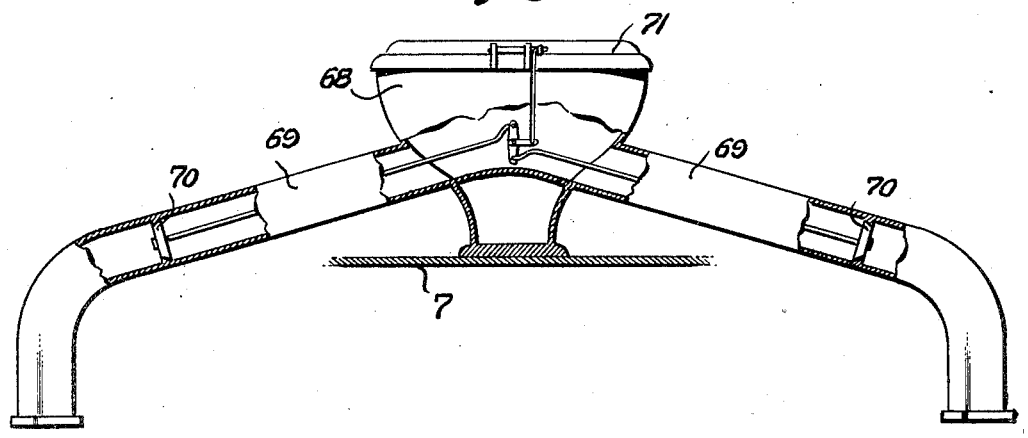
INVENTOR
Stefanos A. Pascales
ATTORNEYS

UNITED STATES PATENT OFFICE.

STELEANOS A. PASCALES, OF DETROIT, MICHIGAN.

LIFE-SAVING DEVICE.

1,363,166. Specification of Letters Patent. Patented Dec. 21, 1920.

Application filed May 28, 1920. Serial No. 384,970.

*To all whom it may concern:*

Be it known that I, STELEANOS A. PASCALES, a subject of the King of Greece, residing at Detroit, in the county of Wayne and State of Michigan, have invented certain new and useful Improvements in Life-Saving Devices, of which the following is a specification, reference being had therein to the accompanying drawings.

This invention relates to life saving boats, and the primary object of my invention is to furnish a life saving boat with buoyant members which are collapsed when the life boat is not in use so that the boat will occupy a comparatively small space on a vessel, and the buoyant members when distended will materially increase the cross sectional area of the life saving boat and thus permit of it riding a rough sea.

Another object of my invention is to provide a life saving boat with collapsible float members and novel means for distending the float members when the life boat is to be placed in use.

A further object of my invention is to provide a life boat of large carrying capacity and the boat is fitted with all modern conveniences and safety devices to insure comfort of the occupants of the boat.

The above and other objects are attained by a boat construction embodying many novel and useful features, and the construction entering into the boat will be hereinafter described and then claimed.

Reference will now be had to the drawings, wherein—

Fig. 4 is another cross sectional view taken on the line IV—IV of Fig. 1, showing the float member collapsed;

Fig. 5 is a perspective view of a portion of the operating mechanism of the collapsible float member;

Fig. 6 is another cross sectional view taken on the line III—III of Fig. 2 showing a toilet compartment of the life boat;

Fig. 7 is an enlarged detail sectional view of a toilet fixture, and

Figure 8:
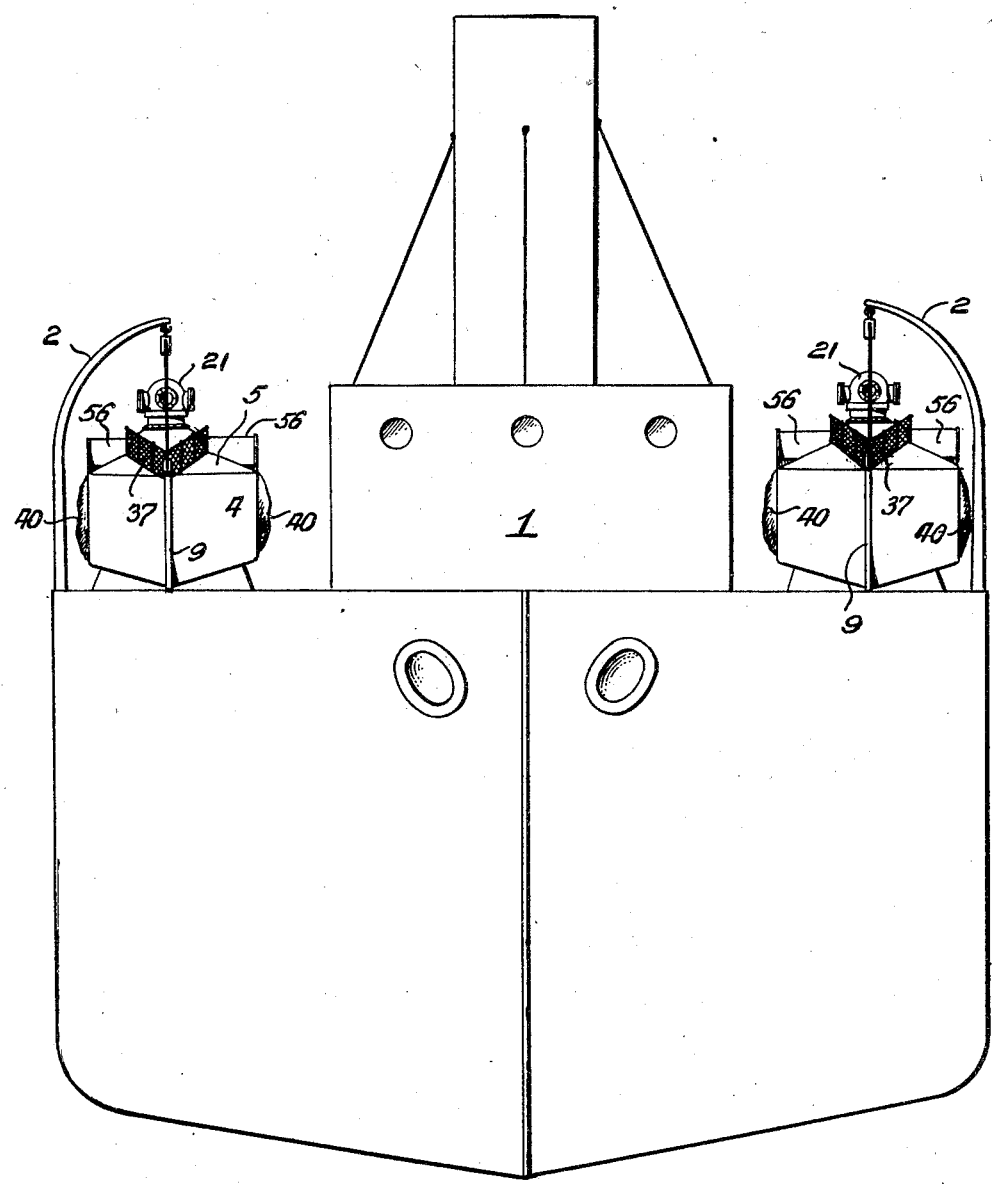
Fig. 8 is a bow view of a sea going vessel provided with life boats in accordance with my invention.

Life boats in accordance with my invention may be placed on the deck of a large sea going vessel 1, as shown in Fig. 8, and the life boats may be launched by davits 2 or other launching means, but in the majority of instances the life boats may simply rest on the deck of the vessel 1 and be launched as the vessel 1 sinks or becomes partially immersed.

Each life saving boat, of which there may be many, has a hull made of a plurality of parallel substantially rectangular frames 3 covered by side walls 4, a deck 5, a keel or bottom 6, a floor 7, and a transom or stern board 8. The side walls 4 converge at the forward end of the boat to form a bow and throughout the length of the hull there is a center board 9 which coöperates with the stern board 8 in supporting a rudder 10 having suitable steering connections 11 with a steering wheel 12 in a steering house or conning tower 13 fixed on the deck 5 contiguous to the bow of the boat. The conning tower 13 is made water tight and provided with windows or sight openings 14, together with such appliances as are usually found in a steering house to permit of a boat being controlled.

The frames 3 may support transverse partitions 15, for instance to provide a toilet compartment 16, otherwise the interior of the boat affords a very large passenger compartment having seats 17 and such equipment as will contribute to the comfort of the passengers within the boat.

On the deck 5 is a large oblong hatch 18 having hatchways 19 which are normally closed and ladders 20 extend from the floor 7 into the hatchways 19 so that passengers may easily enter the boat and depart therefrom.

Centrally of the hatch 18 is a large water tight lamp house 21 containing a conventional form of electric lamp 22 which is used as a night signal. In addition to the lamp 22 there are suitable lighting fixtures 23 throughout the boat and storage batteries 24 in the bow of the boat may supply the necessary current for the lamp 22 and the lighting fixtures 23. The storage batteries 24 may have been previously charged from the vessel 1 or may be supplied from a generator 110

25 in the stern of the boat. The generator 25 may be coupled to a motor 26 and the motor 26 may be driven by a suitable engine 27, but under certain circumstances a propeller 28 coupled to the generator 25 may be depended on to drive the electric generator. The propeller 28 is driven by the action of waves against the same and the rudder 10 is cut away to provide clearance for the propeller. The same propeller may be coupled through to the engine 27 so as to constitute propulsion means for the life boat should it be necessary to resort to same means of moving the life boat.

The deck equipment 5 includes suitable ventilators 29 that may be closed in rough weather, and on the deck are suitable water tight skylights 30 and a collapsible mast 31. The mast 31 is lowered when not in use, otherwise it is maintained in an upright position by stay wires 32 and a portion of a wireless equipment 33, the remainder of the wireless equipment being generally designated 34 within the life boat. The mast 31 may be equipped with suitable visible signals 35 and 36 which are used when it is desired to attract attention to the life boat.

On the deck 5 and throughout the length thereof are railings or life nets 37 and the hull may be provided with ladders or hand grips 38 so that overboard passengers may be rescued and conducted to the hatchways 19 to enter the life boat.

My invention particularly resides in float members which are attached to the side walls 4 of the boat and since the boat members are identical in construction, I deem it only necessary to describe one of said float members.

Suitably attached to the side wall 4 is an oblong or elliptical shaped frame 39 and attached to said frame is a flexible float cover 40 made of a strong, durable and water proof material which when collapsed will be in proximity to the wall 4 and when distended provide a side float member which will lend buoyancy to the life boat.

Figure 1:
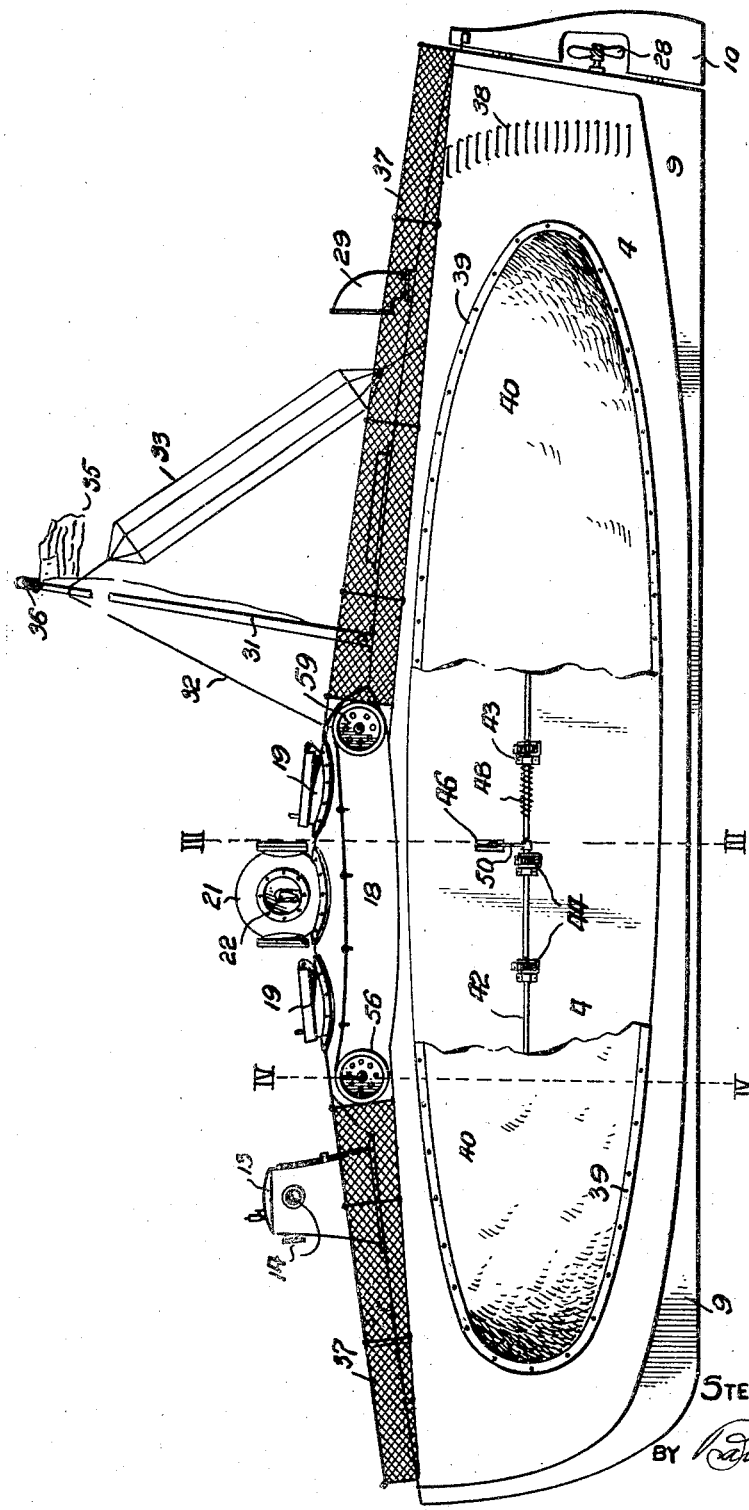
Figure 1 is a side elevation of the life boat with one of the float members thereof partly broken away.
Figure 2:
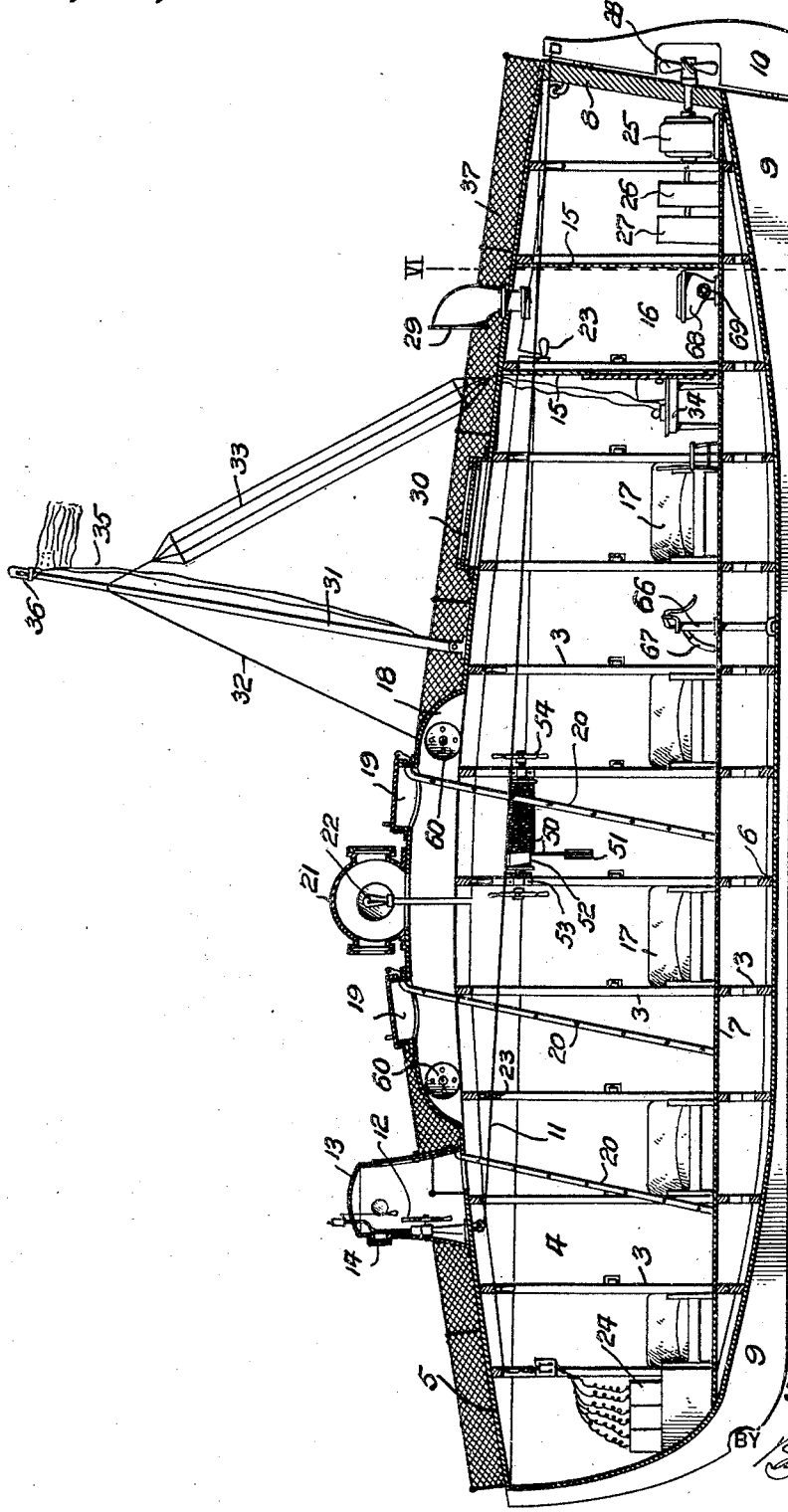
Fig. 2 is a longitudinal sectional view of the life boat.
Figure 3:
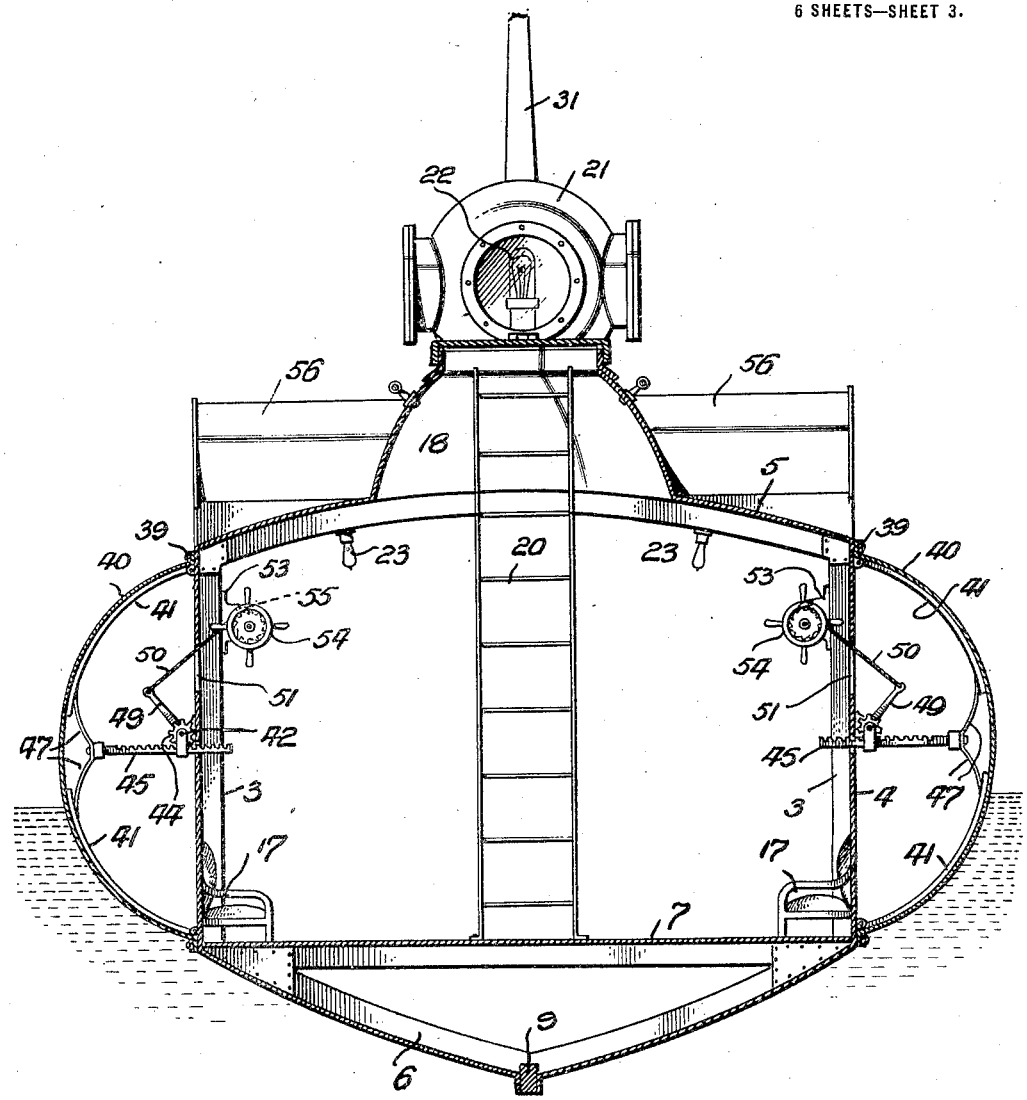
Fig. 3 is an enlarged cross sectional view taken on the line III—III of Fig. 1, showing the float members distended.

At suitable intervals throughout the wall 4 the frame 39 has hinged curved channel arms 41 which are disposed in sets and are adapted to distend the float cover 40, as shown in Fig. 3. To accomplish this a novel mechanism is employed consisting of a longitudinal pinion shaft 42 arranged in suitable bearings 43 carried by the wall 4. The shaft 42 is provided with pinions 44 meshing with racks 45 operatable through openings 46 of the wall 4, and the outer ends of the racks 45 are provided with resilient arms 47 which ride in the channel arms 41 and are adapted to force the same outwardly to distend the cover 40 when the racks 45 are shifted outwardly.

On the shaft 42 are one or more coiled springs 48 having end convolutions thereof attached to the shaft 42 and end convolutions attached to the bearings 43. The springs 48 are placed under tension and when the tension of said springs is released the shaft 42 is spring actuated and the racks 45 pushed outwardly, thereby causing the arms 47 to distend the arms 41 and the cover 40. To place the springs 48 under tension and at the same time retract the racks 45, the shaft has a crank 49 attached to a cable 50 extending through an opening 51 in the wall 4, and said cable is attached to and wound on a drum or windlass 52 supported in suitable bearings 53 on some of the frames 3 within the boat. The drum 52 is adapted to be rotated by hand wheels and a suitable ratchet mechanism 55 will hold the drum with the cable 50 wound thereon and the springs of the shaft 42 under tension. When it is desired to distend the float members, it is only necessary to release the ratchet mechanism 25 when the cable 50 will be partly unwound from its drum 52 and the tension of the springs 48 permitted to turn the shaft 42 to force the racks 45 outwardly and place the float members in active positions.

As intimated in the beginning, the life boat is provided with certain appliances for the comfort of passengers and one of these appliances is in the form of a force feed air supply associated with the hatch 18. Connected to the hatch and communicating therewith are cylinders 56 having stuffing box partitions 57. Slidable in the stuffing box partitions 57 are piston rods 58 having outer apertured piston heads 59 and inner piston heads 60 provided with check valves 61. The outer ends of the cylinders 56 are open and provided with drain openings 62, while the inner ends of said cylinders have air vents 63 controlled by check valves 64.

Encircling the piston rods 58 between the partitions 57 and the outer apertured piston heads 59 are coiled expansion springs 65 holding the apertured piston heads 59 normally in the outer end of the cylinders 56 so that waves may impinge against the outer piston heads and force said piston heads inwardly against the expansive force of the springs 65, which restores said outer piston heads to normal position when released by water pressure. The reciprocable movement imparted to the outer piston heads 59 by the joint action of waves and the springs 65 causes the inner piston heads to serve as pumps and air will be drawn in through the vents 63 and discharged into the hatch 18.

In the compartment of the boat may be placed a pump 66 and a conventional form of filter 67 so that sea water may be obtained and filtered for drinking purposes.

In the toilet compartment 16 of the boat may be placed a hopper or bowl 68 having outside connections 69 providing a conduit which may be flushed by sea water, and in the outside connections 69 are valves 70 articulated with a lid or cover 71 for the hopper or bowl 68 and when the lid or cover is raised to permit of the bowl being used, the valves 70 are opened and admit sea water which washes and cleans the hopper or bowl. When the lid or cover 71 is closed the valves 70 are closed and consequently the toilet compartment cannot be flooded. It is preferable to locate the hopper or bowl 68 slightly above the outside sea level so as to avoid all danger of the toilet compartment being flooded when the valves 70 are opened.

Of all the novel features of my life saving boat, I attach considerable importance to the collapsible float members, as these members, when distended, will materially increase the buoyancy of the boat and prevent capsize of the same, particularly in a rough sea.

While in the drawings there are illustrated the preferred embodiments of my invention, it is to be understood that the structural elements are susceptible to such changes, in size, shape and manner of assemblage, as fall within the scope of the appended claims.

What I claim is:—

1. A life saving boat having side walls, flexible covers carried by the side walls of said boat, arms between said covers and the boat side walls, and means extending through said boat side walls adapted to actuate said arms to distend said covers.

2. A life saving boat as characterized in claim 1 wherein said means includes racks and pinions and a spring actuated shaft to impart movement thereto.

3. In a life boat, a hull, pivoted arms attached to said hull, a flexible cover attached to said hull, over said arms, resilient arms engaging said pivoted arms and adapted to actuate said arms to distend said cover, and means operatable through the side walls of said hull to shift said resilient arms.

4. A life boat as characterized in claim 3, wherein said means includes racks that are normally retracted and automatically projected.

In testimony whereof I affix my signature in the presence of two witnesses.

STELEANOS A. PASCALES.

Witnesses:
ELLEOS LESLY,
KARL H. BUTLER.